(12) United States Patent
Emadi et al.

(10) Patent No.: US 11,402,468 B2
(45) Date of Patent: Aug. 2, 2022

(54) SYSTEMS AND METHODS FOR BLIND ONLINE CALIBRATION OF RADAR SYSTEMS ON A VEHICLE

(71) Applicant: Woven Planet North America, Inc., Los Altos, CA (US)

(72) Inventors: Mohammad Emadi, San Jose, CA (US); Jamaledin Izadian, San Jose, CA (US); Ali Mostajeran, San Jose, CA (US); Renyuan Zhang, Milpitas, CA (US)

(73) Assignee: Woven Planet North America, Inc., Los Altos, CA (US)

( * ) Notice: Subject to any disclaimer, the term of this patent is extended or adjusted under 35 U.S.C. 154(b) by 223 days.

(21) Appl. No.: 16/730,719

(22) Filed: Dec. 30, 2019

(65) Prior Publication Data

US 2021/0199759 A1 Jul. 1, 2021

(51) Int. Cl.
*G01S 7/40* (2006.01)
*G01S 13/931* (2020.01)
*G01S 13/00* (2006.01)

(52) U.S. Cl.
CPC .............. *G01S 7/4026* (2013.01); *G01S 7/40* (2013.01); *G01S 13/931* (2013.01); *G01S 7/403* (2021.05)

(58) Field of Classification Search
None
See application file for complete search history.

(56) References Cited

U.S. PATENT DOCUMENTS

| | | | |
|---|---|---|---|
| 5,670,963 A * | 9/1997 | Kubota | G01S 7/4026 342/70 |
| 10,656,246 B2 * | 5/2020 | Marsch | G01S 7/4026 |
| 10,796,453 B1 * | 10/2020 | Yan | G06T 7/70 |
| 2003/0034913 A1 | 2/2003 | Asanuma | |
| 2004/0027272 A1 | 2/2004 | Richardson | |
| 2008/0300787 A1 * | 12/2008 | Zeng | G01S 7/4026 701/301 |

(Continued)

FOREIGN PATENT DOCUMENTS

EP 3104189 A1 12/2016

OTHER PUBLICATIONS

European Patent Office, International Search Report and Written Opinion for PCT/US2020/066872, dated Mar. 19, 2021, 20 pages.

*Primary Examiner* — Bernarr E Gregory
(74) *Attorney, Agent, or Firm* — Christopher G. Darrow; Darrow Mustafa PC

(57) ABSTRACT

Systems, methods, and non-transitory computer-readable media provide a blind online calibration mechanism to calibrate the position of the radar unit while the self-driving vehicle is in motion without the use of any map data. Specifically, a calibration system associated with the self-driving vehicle is configured to adjust the boresight angle of the radar within a calibration range and monitor the convergence or divergence pattern of the resulting clutter locations. The boresight angle of the radar unit may be progressively adjusted in static or dynamic degree increments until the convergence of the clutter curves is observed. In this way, without using any map data or factory settings, radar calibration can be conducted as often as needed while the vehicle is moving. Radar sensing and measurement accuracy is thus improved.

20 Claims, 9 Drawing Sheets

(56) References Cited

U.S. PATENT DOCUMENTS

| | | | | |
|---|---|---|---|---|
| 2010/0165102 A1* | 7/2010 | Klebanov | ................ | G06T 7/70 |
| | | | | 348/135 |
| 2010/0235129 A1* | 9/2010 | Sharma | ................ | G01S 7/4972 |
| | | | | 702/97 |
| 2013/0218398 A1* | 8/2013 | Gandhi | ................ | G01S 13/931 |
| | | | | 701/31.1 |
| 2014/0368651 A1* | 12/2014 | Irschara | ................... | G06T 7/80 |
| | | | | 348/148 |
| 2015/0070207 A1* | 3/2015 | Millar | ................... | G01S 13/931 |
| | | | | 342/174 |
| 2016/0267657 A1* | 9/2016 | Gupta | ...................... | G06T 7/80 |
| 2017/0261599 A1* | 9/2017 | Zeng | .................... | G01S 7/4004 |
| 2018/0113195 A1* | 4/2018 | Bialer | ................... | G01S 7/4004 |
| 2019/0293756 A1 | 9/2019 | Blaes | | |
| 2020/0132812 A1* | 4/2020 | Dvorecki | .............. | G01S 7/4026 |
| 2020/0200870 A1* | 6/2020 | Nemati | ................. | G01S 13/931 |
| 2020/0209369 A1* | 7/2020 | Koch | ................... | G01S 7/4972 |

* cited by examiner

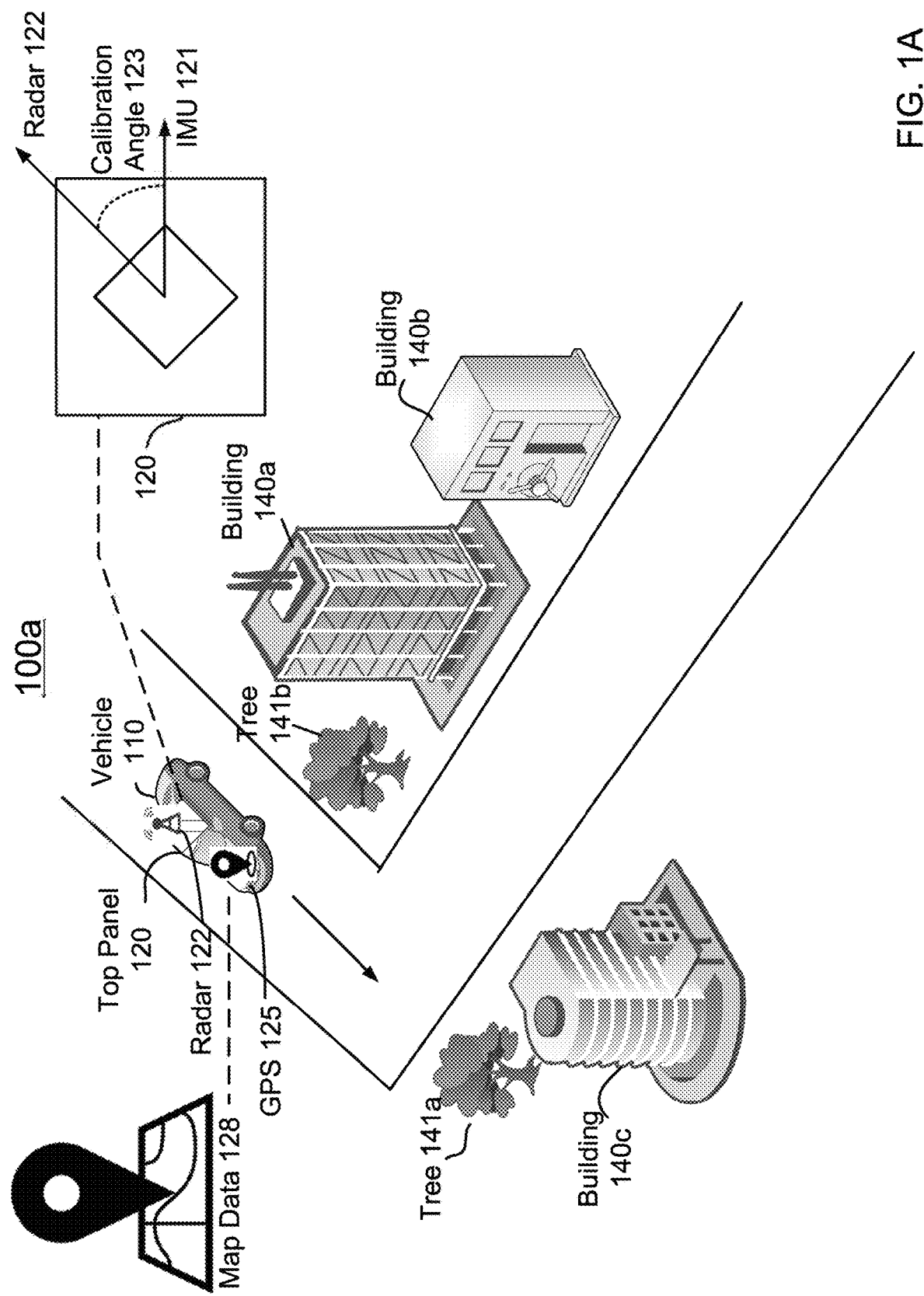

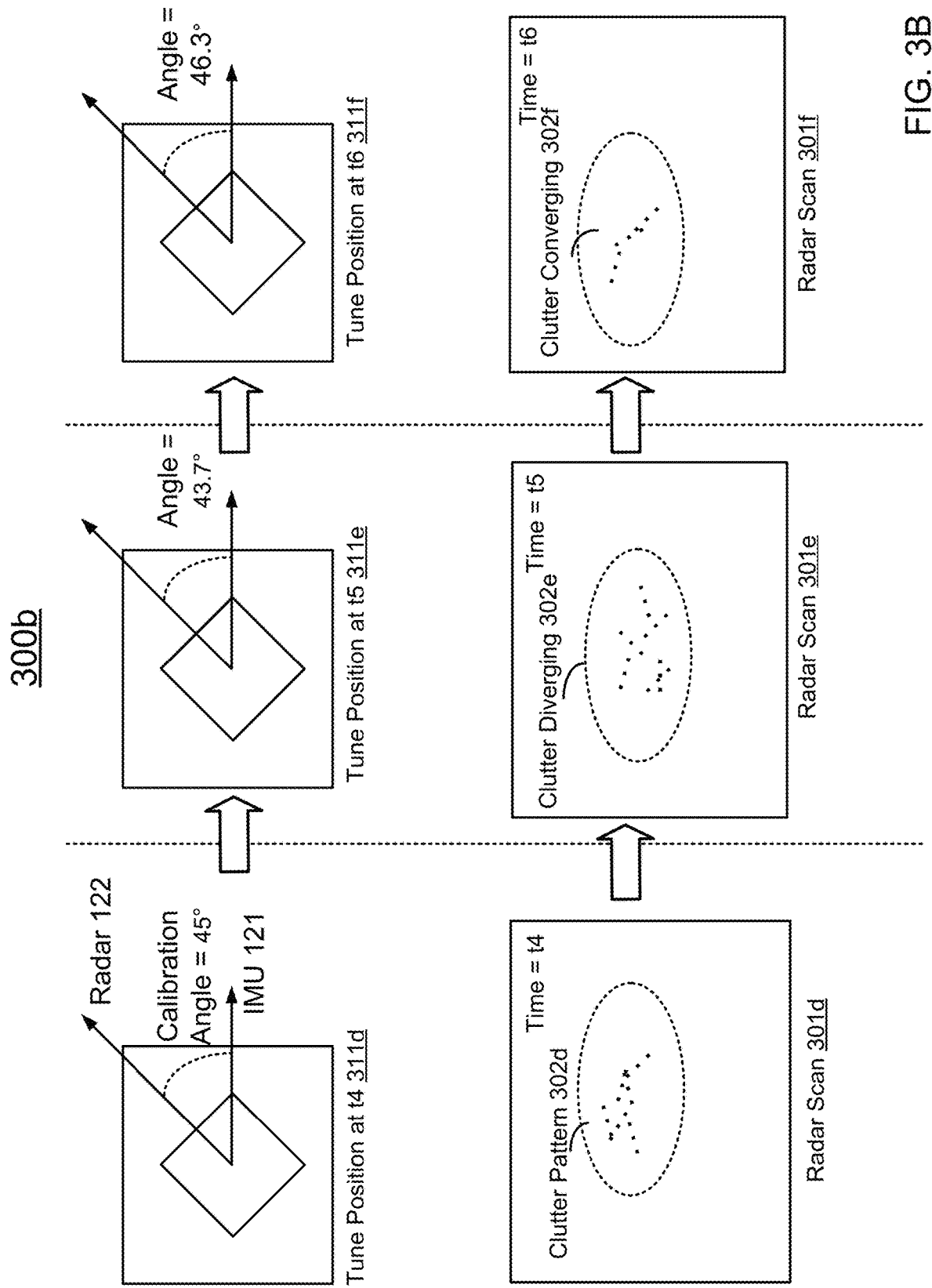

SYSTEMS AND METHODS FOR BLIND ONLINE CALIBRATION OF RADAR SYSTEMS ON A VEHICLE

FIELD OF THE INVENTION

The present technology relates to vehicle systems and navigation systems. More particularly, the present technology relates to systems, apparatus, and methods for blind online calibration of radar systems on a vehicle.

BACKGROUND

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input as appropriate. The vehicle may include a variety of systems and subsystems for enabling the vehicle to determine its surroundings so that it may safely navigate to target destinations or assist a human driver, if one is present, with doing the same. As one example, the vehicle may be installed with a radar unit, along with other sensors such as an inertial measurement unit (IMU), which provides measurement data of objects in the environment that the vehicle is situated at such that the vehicle can make or assist a human driver to make a navigation decision. Such measurement is affected by the position of the radar unit, e.g., the angle between the radar unit and the IMU, which are both usually placed on top of the vehicle. Thus, the angle usually needs to be calibrated to provide accurate radar sensing and measurement.

Traditionally, radar calibration is performed offline at specific calibration locations such as at the factory, which can often be inconvenient and may not satisfy calibration requests on demand. Some online calibration may be performed with static objects along the driving route while the vehicle is traveling, but the static objects usually need to be pre-identified with map data having very accurate and detailed location information for the static object. It can be difficult to capture the level of detail necessary for accurate calibration when objects change regularly in the real world environment. When the map data fails to be the most up-to-date or is unavailable, such online calibration can be inaccurate or cannot be implemented at all. When the map data fails to be the most up-to-date version or is unavailable, such map-based online calibration can be inaccurate or cannot be implemented at all. In addition, the traditional map-based calibration protocol requires the precise location information of the vehicle in order to identify a reference static object in the vicinity of the vehicle. When the Global Positioning System (GPS) signal reception is poor or the vehicle is not equipped a GPS device, the calibration cannot be applied at all. Thus, the traditional map-based calibration protocol highly depends on the environment and network access of the vehicle and cannot be applied dynamically or on demand reliably while the vehicle is traveling to different places.

SUMMARY

Various embodiments of the present technology can include systems, methods, and non-transitory computer readable media configured to calibrate a sensor unit on a vehicle while the vehicle is in motion. A control signal is transmitted, from a processor to the sensor unit, which causes the sensor unit to be tuned to a plurality of positions while the vehicle is in motion. A plurality of sensor data scans are captured by the sensor unit while the sensor unit is tuned to the plurality of positions. One or more target points are identified from each of the plurality of sensor data scans. The one or more target points represent one or more static objects in an environment that the vehicle is located in while in motion. A calibration position is determined for the sensor unit based on a trajectory pattern of the one or more target points over the plurality of sensor data scans.

In some embodiments, the sensor unit is a radar unit, and each of the plurality of positions includes a boresight angle that the radar unit is facing.

In some embodiments, the sensor unit is tuned by swiping the boresight progressively at a pre-defined degree increment each time in a plus or a minus direction.

In some embodiments, the plurality of sensor data scans are captured at a pre-defined interval, and at least one or more of the plurality of sensor data scans are captured at each of the positions that the sensor unit is tuned to.

In some embodiments, a first set of target points are identified from a first sensor data scan from the plurality of sensor data scans, and a second set of target points are identified from a second sensor data scan from the plurality of sensor data scans. In response to determining that an aggregated average distance between the first set of target points and the second set of target points within a sensor data scan frame is less than a pre-defined threshold, the first set of target points and the second set of target points are identified as relating to a same static object in the environment.

In some embodiments, the trajectory pattern of the one or more target points is monitored, representing a same static object in the environment shown in the plurality of sensor data scans. A position for the sensor unit is identified, at which the one or more target points representing the same static object shown in a corresponding sensor data scan captured at the position contains exhibit a minimum variance. The position is determined as the calibration position for the sensor unit.

In some embodiments, the position associated with the minimum variance is determined by obtaining a first sensor data scan captured when the sensor unit is tuned to a first position; identifying a first set of target points from the first sensor data scan, transmitting, to the sensor unit, a first control signal that causes the sensor unit to be progressively tuned in a first direction from the first position to a second position, obtaining a second sensor data scan captured when the sensor unit is tuned to the second position, identifying, from the second sensor data scan, a second set of target points representing the same static object with the first set of garget points, and in response to determining that the second set of target points is converging as compared with the first set of target points, transmitting, to the sensor unit, a second control signal that causes the sensor unit to be tuned in the first direction from the second position to a third position.

In some embodiments, in response to determining that the second set of target points is diverging as compared with the first set of target points, a third control signal is transmitted, to the sensor unit, which causes the sensor unit to be tuned in a second direction that is opposite to the first direction.

In some embodiments, the calibration position for the sensor unit is updated periodically or on demand while the vehicle is in motion.

In some embodiments, the calibration position for the sensor unit is determined or updated without using any map data indicating a location of the one or more static objects in the environment.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

BRIEF DESCRIPTION OF THE DRAWINGS

FIGS. 1A-1B are block diagrams illustrating an example overview of a vehicle conducting calibration of the position of its radar unit using a map-based approach (FIG. 1A), compared with blind online calibration while the vehicle is moving around a street corner (FIG. 1B), according to an embodiment of the present technology.

FIGS. 3A-3B illustrate example schematic radar images captured at different times when the radar unit is being tuned to different positions while the self-driving vehicle is moving, according to an embodiment of the present technology.

Figure 1B:
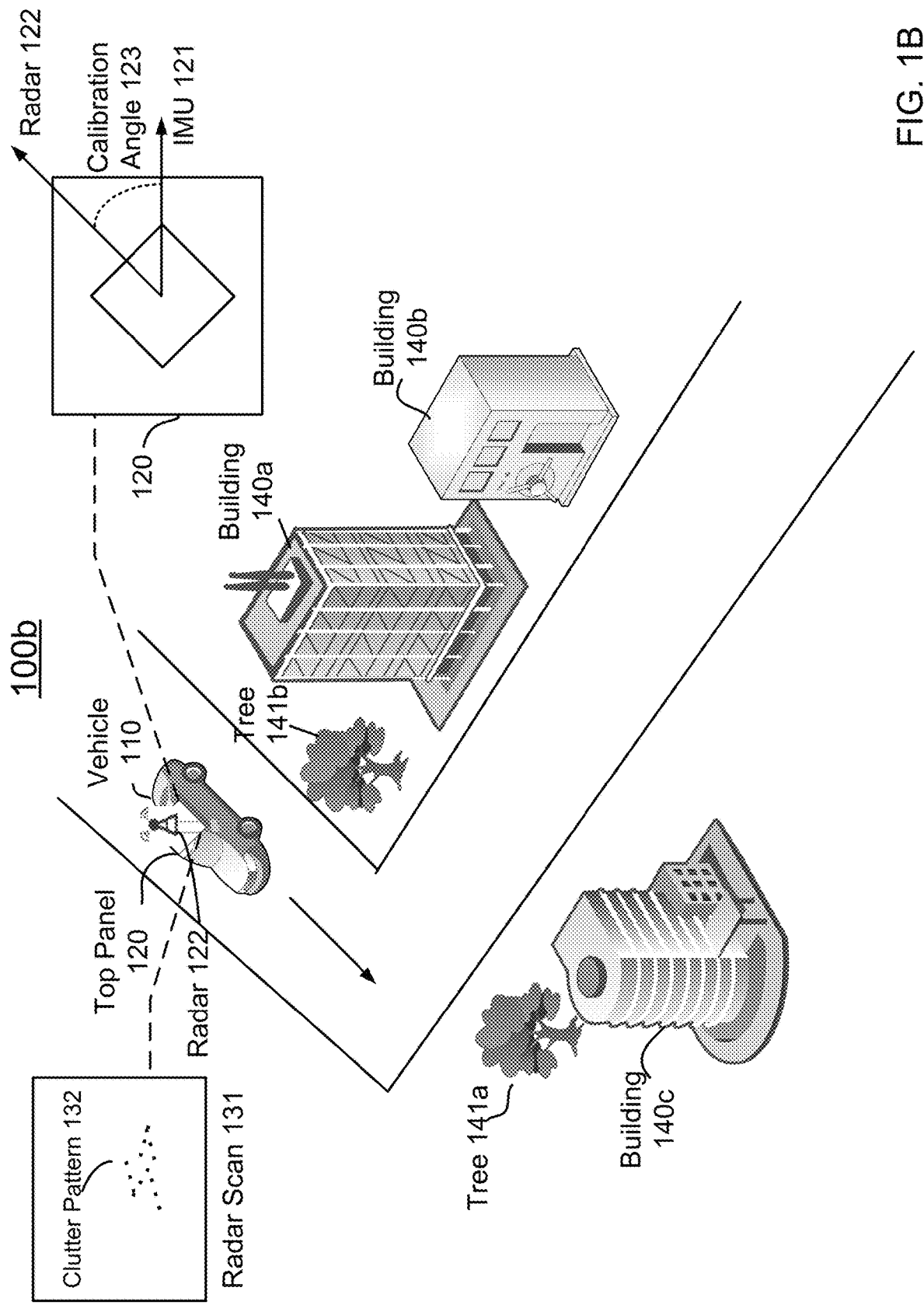

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input as appropriate. The vehicle may include a variety of systems and subsystems for enabling the vehicle to determine its surroundings so that it may safely navigate to target destinations or assist a human driver, if one is present, with doing the same. As one example, the vehicle may be installed with a radar unit, along with other sensors such as an inertial measurement unit (IMU), which provides measurement data of objects in the environment that the vehicle is situated at such that the vehicle can make or assist a human driver to make a navigation decision. Such measurement is affected by the position of the radar unit, e.g., the angle between the radar unit and the IMU, which are both usually placed on top of the vehicle. Thus, the angle usually needs to be calibrated to provide accurate radar sensing and measurement.

Traditionally, radar calibration is performed offline at specific calibration locations such as at the factory, which can often be inconvenient and may not satisfy calibration requests on demand. Some online calibration may be performed with static objects along the driving route while the vehicle is traveling, but the static objects usually need to be pre-identified with map data. The required map data, such as a geometric map of a geographic location, can include data pertaining to geometric features (e.g., physical features) that correspond to the geographic location. A geometric map may include, for example, positions and/or shapes of physical structures or objects or other physical features in a geographic location. For example, FIG. 1A provides an example block diagram 100a illustrating an example overview of a vehicle 110 conducting calibration of the position of its radar unit 122 using a map-based approach.

Diagram 100a shows vehicle 110 traveling in the street, with static objects such as trees 141a-b and various buildings 140a-c on both sides of the street. The vehicle 110 is equipped with a GPS system 125, and a radar unit 122 (e.g., on a top panel 120 of the vehicle 110). To use a map-based approach to calibrate the position of the radar unit 122, precise location information of the vehicle 110 must be obtained from the GPS system 125 for the vehicle 110 to obtain pre-defined map data 128 associated with a specific location. The map data 128 must contain detailed geometric information at the location such as the positions and/or shapes of physical structures or objects or other physical features, such as trees 141a-b, buildings 140a-c and/or the like in the geographic location. The vehicle 110 may then compare clutters from the radar scans captured by the radar unit 122, which is supposedly indicative of static objects at the specific geographic location, with the geometric map data 128. For example, if the map data 128 indicates a tree 141a at a specific location within a certain distance or vicinity of the vehicle 110, the vehicle 110 may verify whether a captured radar scan shows clutter points indicative of a tree at a respective location. When clutter from radar scans captured by the radar unit 122 are inconsistent with the static object information from the map data 128, the position of the radar unit 122, e.g., the angle 123 between the radar unit 122 and an IMU unit 121, can be adjusted until the clutter coincides with the map data 128.

Thus, the traditional map-based calibration protocol requires the precise location information of the vehicle 110 and accurate geometric map data 128. When the map data fails to be the most up-to-date version or is unavailable, or when the vehicle 110 fails to localize accurately (e.g., due to GPS interference or weak reception, poor SLAM performance, etc.), or even a localization system 125 may not be available to the vehicle 110, such map-based online calibration can be rather inaccurate or cannot be implemented at all. Therefore, the traditional map-based calibration protocol highly depends on the environment and network access of the vehicle 110 and cannot be applied dynamically or on demand reliably while the vehicle 110 is traveling to different places.

In view of the need for convenient and accurate online radar calibration for vehicles, a blind online calibration mechanism is provided, which utilizes radar data scans captured by the radar unit 122 to analyze clutter points that are supposedly indicative of static objects in the radar scans. The clutter points analysis can then be used to calibrate the radar position while the vehicle 110 continuously or periodically captures radar scans when in motion. As used herein, the term "blind" is used to refer to the absence or lack of any geometric map data. As used herein, the term "online" is used to refer to dynamic updating while a vehicle is operating and in motion, as opposed to an "offline" calibration which requires the vehicle to not be operating or moving outside of a calibration factory or other predefined calibration process. Thus, the blind online calibration mechanism described herein refers to radar unit calibration while the vehicle is in motion without using any pre-stored geometric map data.

FIG. 1B provides a block diagram 100b illustrating an example overview of vehicle 110 conducting blind online calibration of the position of its radar unit 122 without any use of pre-stored map data. Similar to FIG. 1A, as also shown in FIG. 1B, vehicle 110 is equipped with multiple sensors at the top panel 120, including the IMU 121 and the radar unit 122 being placed with an angle 123 in between.

When vehicle 110 is in motion, e.g., travels along the street, the radar unit 122 is configured to generate radar scans or images 131 of the surroundings at fixed intervals, e.g., 50-100 ms apart. The radar scans 131 captured by the radar unit 122 may contain data points representing static or moving objects in the environment. For example, static objects may include buildings 140a-c, trees 141a-b, etc. Ideally, the trajectory pattern 132 of the clutter points on the radar scans 131 representing one or more static objects should be clear and well-defined, e.g., a straight line may represent the wall of building 140a-c. When the angle 123 between the radar 122 and the IMU 121 deviates from a pre-set position, the clutter locations shown on a radar image may exhibit noise, e.g., instead of forming a straight line, target points representing the wall of buildings 140a-c may appear to form an irregular shape.

When the angle 123 between the radar 122 and the IMU 121 is calibrated, e.g., by tuning the angle 123 in ±0.1 degree increments, the clutter locations observed from radar images may change. The angle 123 may continue to be tuned until a convergence of the clutter locations is observed, e.g., when a cloud of points converges to a straight line representing the wall of a building. The adjusted angle at clutter pattern convergence is considered the newly calibrated angle between the radar unit 122 and IMU 121. For example, when the angle 123 between the radar unit 122 and the IMU 121 is set to be 45 degrees, the angle 123 may be progressively adjusted until a convergence of the clutter points is obtained, e.g., at 48.3 degrees. Thus, the angle 123 between the radar unit 122 and the IMU 121 is re-calibrated at 48.3 degrees. In this way, without using any map data or factory settings, radar calibration can be conducted as often as needed while the vehicle is moving without requiring maintenance, detailed and labor or time-intensive calibration processes. Radar sensing and measurement accuracy is thus improved.

It is noted that the adjustment of ±0.1 degree of calibration angles is used as an example only. The angle 123 may be adjusted with different accuracy such as ±0.05 degree, ±0.01 degree, ±0.001 degree, etc.

Figure 2:
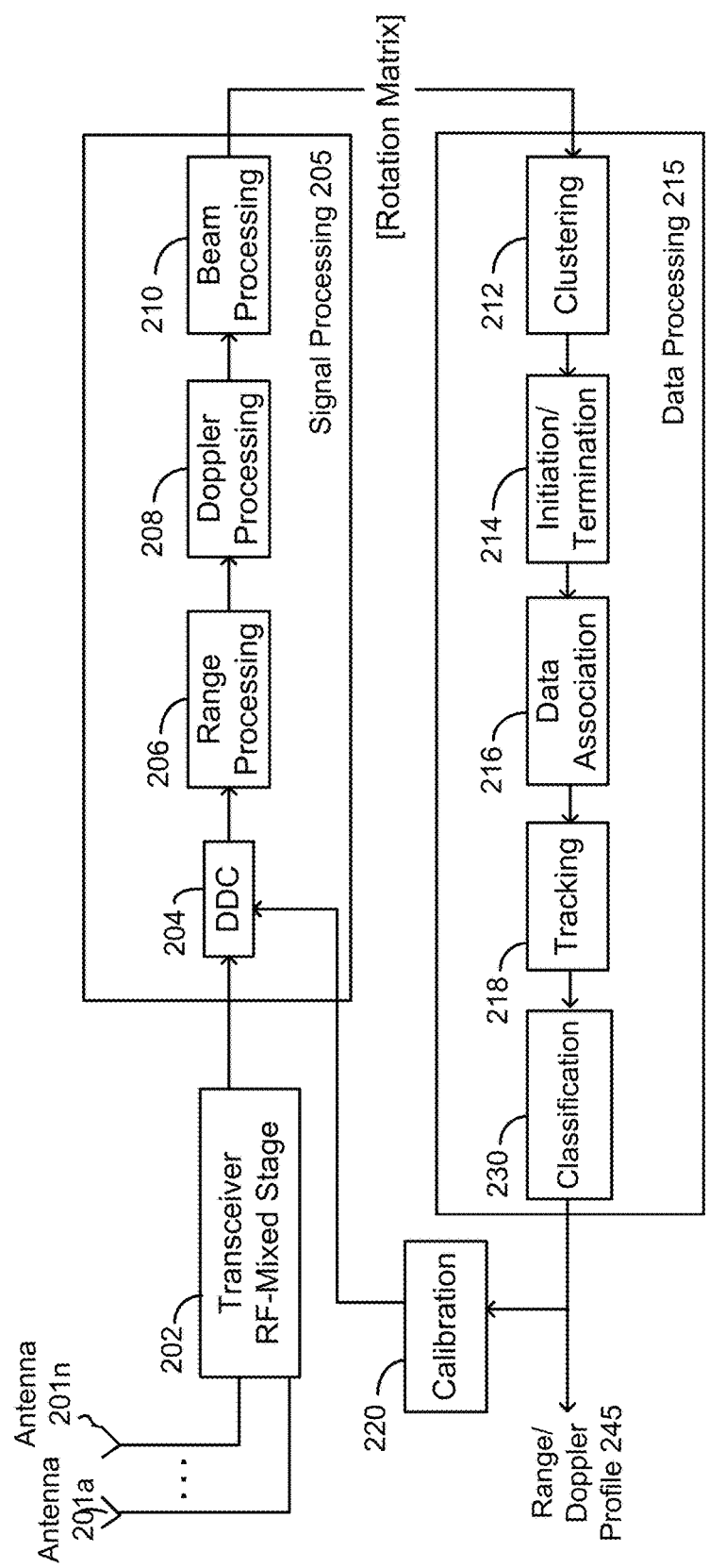
FIG. 2 illustrates an example radar system that may be equipped with a vehicle system, according to an embodiment of the present technology.

FIG. 2 is a block diagram 200 illustrating an example structure of a radar processing unit (e.g., the radar unit 122) at the vehicle 110 shown in FIGS. 1A-1B. The radar processing unit includes a transceiver 202, which is configured to receive, via one or more antennas 201a-n, radio frequency (RF) signals representing reflections from objects in the environment where the vehicle is situated. For example, RF signals reflected from the trees 141a-b, buildings 140a-c as shown in FIGS. 1A-1B may be received at the transceiver 202.

The transceiver 202 is configured to process RF signals at RF-mixed stage, and then send the processed RF signal to a signal processing block 205, which includes a digital down converter (DDC) 204, which may in turn down sample the processed RF signal for a range processing block 206, which processes and transmits the signal to a doppler processing block 208, where the output signal is transmitted to a beam processing block 210. After signal processing by the signal processing block 205, a rotation matrix may be applied to the output of the signal processing block 205 to formulate a set of raw data points, which are fed to a data processing block 215.

At the data processing block 215, a clustering block 212 is configured to determine a cluster of target points from the raw radar data. An initiation/termination block 214 may determine whether and when the determined cluster is to be tracked as a moving object and when to terminate the tracking. A data association block 216 may associate clusters of points from radar data captured at different times as representing the same object. A tracking block 218 may track a cluster of points that represents a moving or static object from radar data captured at different times. A classification block 230 may classify the tracked radar data from the tracking block 218, which in turn provides range/doppler profile data 245 of tracked target points. For example, the range/doppler profile data 245 may include the azimuth, range, velocity, coordinates in the inertial coordinate system, coordinates in the radar coordinates of the target, and/or the like.

A calibration block 220 may be configured to receive and analyze the range/doppler profile data 245, based on which the calibration block 220 may determine whether to transmit a signal to physically tune the position of the radar unit (e.g., as shown by the angle 123 between the radar unit 122 and the IMU 121 in FIGS. 1A-1B). The calibration block 220 may send data relating to the adjusted angle between the radar unit and the IMU to the signal process block 205, which may in turn update the parameter(s) for the range processing block 206, the doppler processing 208 block and the beam processing block 210.

Figure 3A:
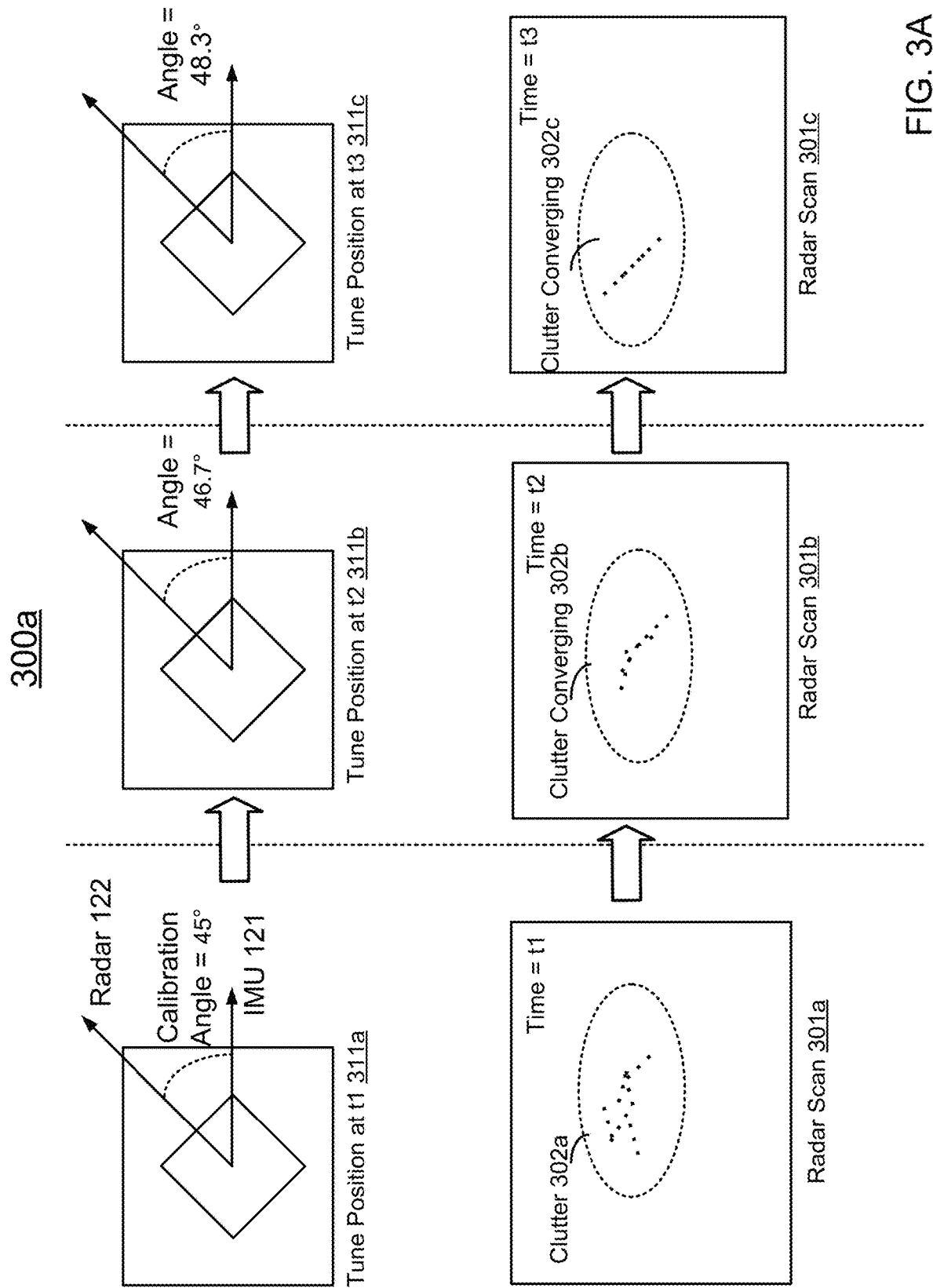

FIGS. 3A-3B illustrate example schematic radar images captured at different times when the radar unit 122 shown in FIGS. 1A-1B is being tuned to different positions while the vehicle is moving. As shown at diagram 300a in FIG. 3A, the radar unit 122 can be tuned to different positions at different time stamps at 311a-c. At each position 311a-c, a radar scan 301a, 301b or 301c may be captured. For example, when the angle between the radar 122 and the IMU 121 is set at 45° at t1 (311a), radar scan 301a is captured, showing a clutter pattern 302a. Similarly, when the angle between the radar 122 and the IMU 121 is tuned to 46.7° at t2 (311b), radar scan 301b is captured, showing a clutter pattern 302b, which is more convergent than the clutter pattern 302a. When the angle between the radar 122 and the IMU 121 is tuned to 48.3° at t3 (311c), radar scan 301c is captured, showing a clutter pattern 302c which approximately converges to a straight line. When the clutter pattern 302c converges, e.g., to a straight line, a spot, etc., showing a minimum average distance among the target points which corresponds to the minimum variance of the global coordinates of the target points, the corresponding position of the radar unit 122 can be considered as the newly calibrated position. Here, the angle of 48.3° between the radar 122 and the IMU 121 is the newly calibrated position.

Diagram 300b in FIG. 3B shows another scenario of tuning the angle between the radar 122 and IMU 121. Similar to 200a in FIG. 3A, the angle between the radar 122 and the IMU 121 may be set at 45° at t4 (311d), radar scan 301d is captured, showing a clutter pattern 302d. Instead of incrementing the angle, the angle between the radar 122 and the IMU 121 may be tuned in a different direction, e.g., to 43.7° at t5 (311e), which results in radar scan 301e, showing a clutter pattern 302e. The clutter pattern 302e is more scattered and divergent than the clutter pattern 302d at t4. In that case, the calibration may be turned to a different direction, e.g., instead of continuing decreasing the angle, the angle between the radar 122 and the IMU 121 may be gradually incremented. For example, the angle between the radar 122 and the IMU 121 may be tuned to 46.3° at t6 (311f), radar scan 301f is captured, showing a clutter pattern 302f, which shows a converging trend as compared with clutter pattern 302e at t5. Therefore, the calibration may continue to increment the angle for more convergence of the clutter pattern. In some embodiments, the incremented angle may vary depending on a desired convergence. For example, if a subsequent convergence is minimal from the previous radar scan, the next tuning may be done with a higher angle increment. In another example, if the clutter is close to a desired convergence (e.g., within a certain threshold), the next tuning may be done with a lower angle increment than the previous angle increment.

In some embodiments, the radar scans 301a-f may be provided through a user interface (e.g., an I/O interface 708 shown in FIG. 7), and a human driver may observe the clutter patterns 302a-f, e.g., diverging or converging in order to tune the radar position accordingly. In some embodiments, a computing processor at the radar unit 122, e.g., the signal processing block 205 and/or the data processing block 215, may compute a metric associated with the target points, e.g., the mean-square distance between the set of target points, and decide whether the set of target points are converging or diverging based on the metric as the position of the radar unit is being tuned.

Figure 4:
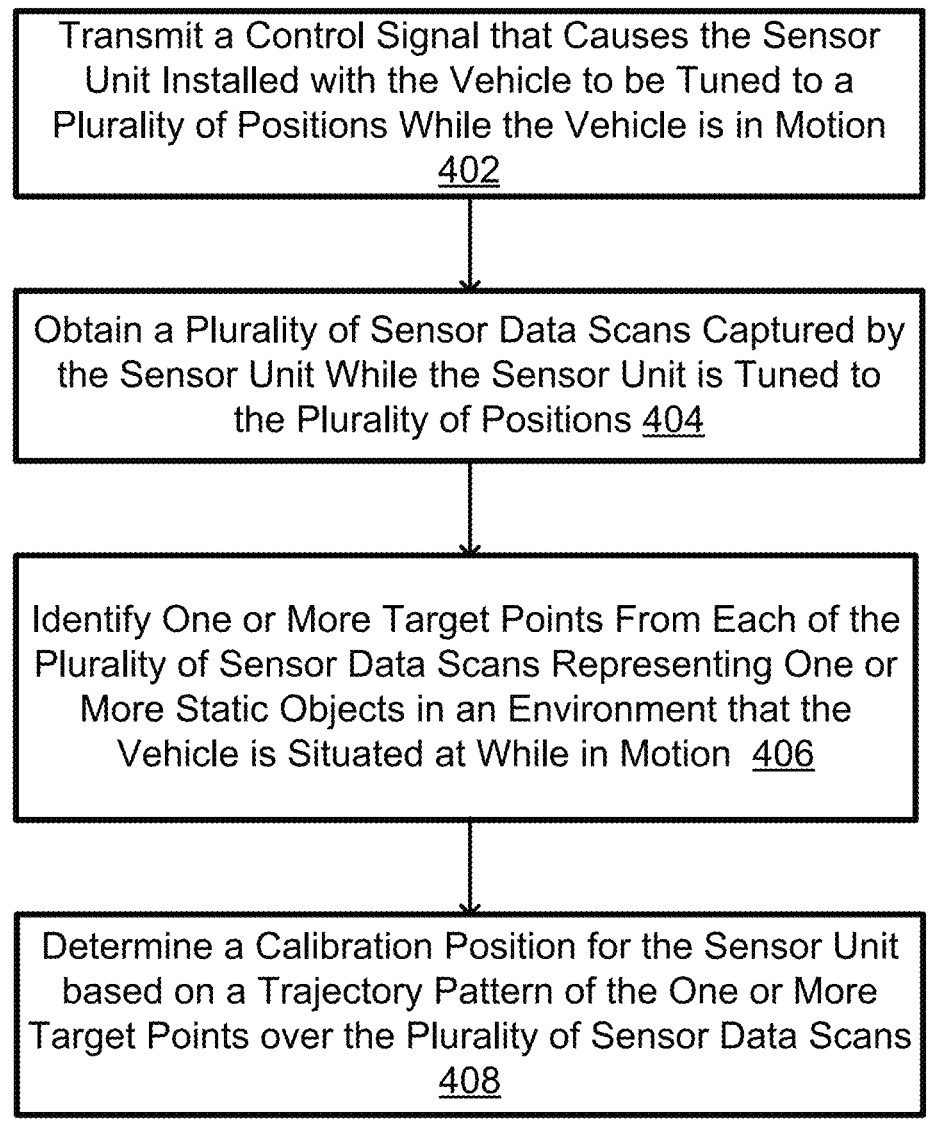
FIG. 4 is an example logic flow diagram illustrating a method performed by a processing unit on the vehicle to calibrate the position of the radar unit while the self-driving vehicle is moving, according to an embodiment of the present technology.

FIG. 4 is an example logic flow diagram illustrating a method 400 performed by a processing unit on the vehicle to calibrate the position of the radar unit while the vehicle is moving. One or more of the processes or steps 402-408 of method 400 may be implemented, at least in part, in the form of executable code stored on non-transitory, tangible, machine-readable media (e.g., memory 704 and/or storage 706 in FIG. 7) that when run by one or more processors (e.g., processor 702 in FIG. 7) may cause the one or more processors to perform one or more of the processes 402-408. Further, one or more of the processes or steps may be omitted, combined, and/or performed in a different sequence as desired.

At step 402, a control signal is transmitted, from a processor (e.g., 702 in FIG. 7) to a sensor unit (e.g., the radar unit 122 in FIGS. 1A-1B), which causes the sensor unit to be tuned to a plurality of positions while the vehicle (e.g., 110 in FIGS. 1A-1B) is in motion. For example, the control signal may indicate a plurality of different angles between the radar unit and the IMU, e.g., at positions 311a-f in FIGS. 3A-3B.

At step 404, a plurality of sensor data scans (e.g., radar scans 301a-f in FIGS. 3A-3B) are captured by the sensor unit while the sensor unit is tuned to the plurality of positions (e.g., positions 311a-f in FIGS. 3A-3B).

At step 406, one or more target points (e.g., see clutters 302a-f in FIGS. 3A-3B) are identified from each of the plurality of sensor data scans. The one or more target points may represent one or more static objects (e.g., trees 141a-b, or buildings 140a-c shown in FIGS. 1A-1B) in an environment that the vehicle is located in while in motion. For example, the radar system (e.g., the data processing block 215 in FIG. 2) may determine a set of points from a radar scan by tracking the set of points over a series of scans and evaluate whether the set of points are likely to be clutter. Specifically, the radar system may obtain a first set of target points (e.g., 302a in FIG. 3A) from a first sensor data scan (e.g., 301a in FIG. 3A) and a second set of target points (e.g., 302b in FIG. 3A) from a second sensor data scan (e.g., 301b in FIG. 3A) and determine whether an aggregated average distance between the first set of target points and the second set of target points within a sensor data scan frame is less than a pre-defined threshold, e.g., indicating that the target points have very little movement. Additional criteria for determining clutter points from radar scans can be found in co-pending and commonly-owned U.S. non-provisional application Ser. No. 16/730,738, filed Dec. 30, 2019, entitled "Systems and Methods for Adaptive Clutter Removal", which is hereby expressly incorporated by reference herein in its entirety.

At step 408, a calibration position for the sensor unit is determined based on a trajectory pattern of the one or more target points over the plurality of sensor data scans, e.g., based on the divergence or convergence pattern of the clutter, as further discussed below in relation to FIG. 5.

Figure 5:
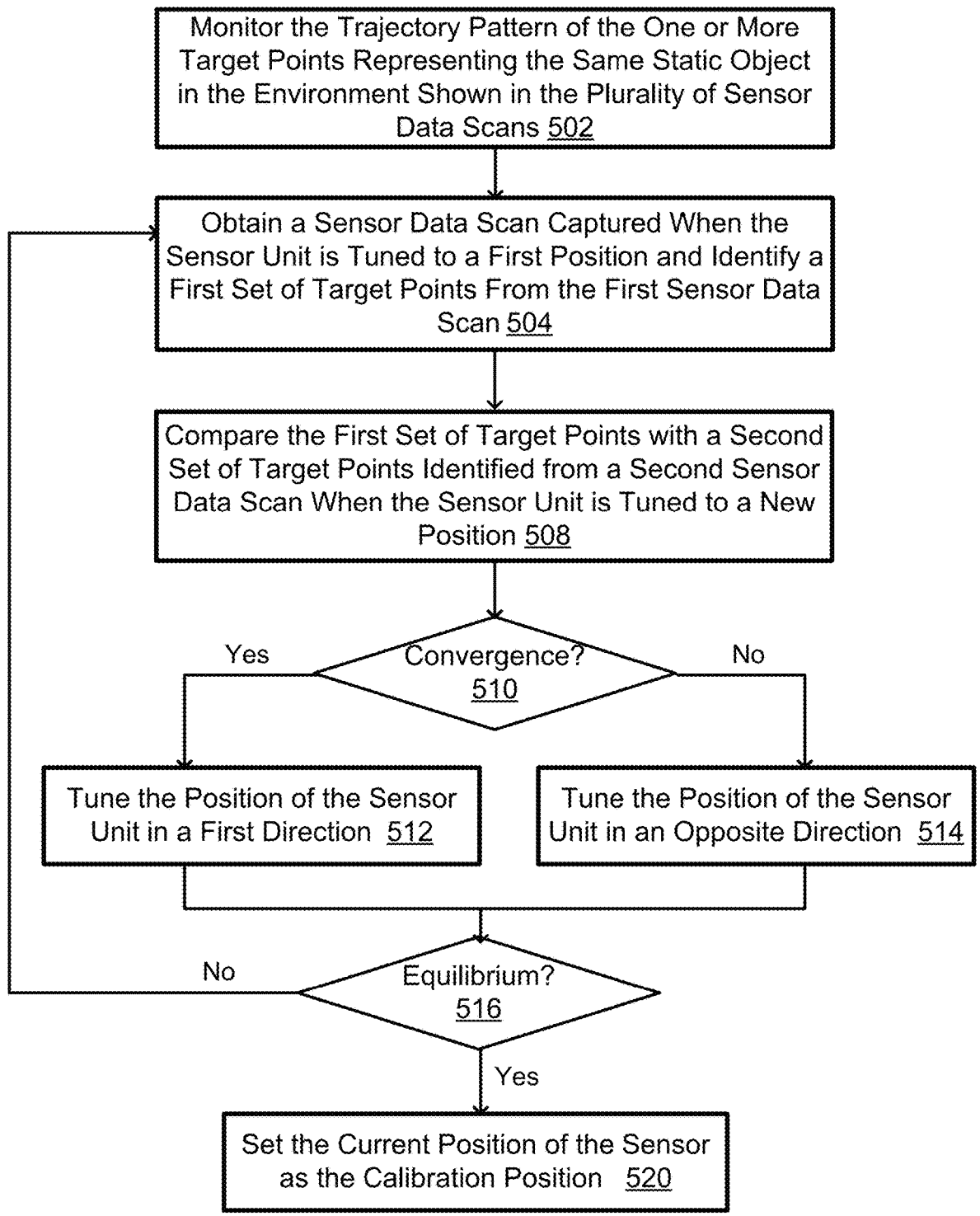
FIG. 5 is an example logic flow diagram illustrating the process of progressively determining a calibration position for the radar unit based on the trajectory pattern of the one or more target points over a series of radar scans, according to an embodiment of the present technology.

FIG. 5 is an example logic flow diagram illustrating the process 408 of progressively determining a calibration position for the radar unit based on the trajectory pattern of the one or more target points over a series of radar scans. One or more of the processes or steps 502-520 of process 408 may be implemented, at least in part, in the form of executable code stored on non-transitory, tangible, machine-readable media (e.g., memory 704 and/or storage 706 in FIG. 7) that when run by one or more processors (e.g., processor 702 in FIG. 7) may cause the one or more processors to perform one or more of the steps 502-520. Further, one or more of the processes or steps may be omitted, combined, and/or performed in a different sequence as desired.

At step 502, the trajectory pattern of the one or more target points (e.g., see clutter 302a-f in FIGS. 3A-3B) representing the same static object in the environment shown in the plurality of sensor data scans (e.g., radar scans 301a-f in FIGS. 3A-3B) are monitored.

At step 504, a first sensor data scan (e.g., 301a in FIG. 3A) is captured when the sensor unit (e.g., radar 122 in FIG. 3A) is tuned to a first position, e.g., at 45° at 311a in FIG. 3A. A first set of target points (e.g., 302a in FIG. 3A) from the first sensor data scan is identified. After a first control signal is transmitted to the sensor unit, causing the sensor unit to be progressively tuned in a first direction (e.g., incrementing the angle), a second sensor data scan (e.g., 301a in FIG. 3A) is captured when the sensor unit is tuned to the second position (e.g., 311b in FIG. 3A).

At step 508, the first set of target points (e.g., 302a in FIG. 3A) are then compared with the second set of target points (e.g., 302b in FIG. 3B).

At step 510, the radar system determines whether the target points are converging or diverging from the first position to the second position. If convergence is observed, the position of the sensor unit will continue to be tuned in the same direction (e.g., incrementing the angle) at step 512.

Otherwise, if divergence is observed, the position of the sensor unit will be tuned in an opposite direction (e.g., decreasing the angle) at step 514.

At step 516, the radar system determines whether an equilibrium has been reached. For example, an equilibrium may be reached, e.g., when the variance of the global coordinates of the target points are minimized, if tuning the angle either up or down would result in the divergence of the clutter pattern. If the equilibrium (minimum variance) has not been reached yet, process 408 continues with step 504 to further tune the position of the sensor unit. If the equilibrium has been reached, the radar system may set the current position of the sensor unit as the latest calibrated position at step 520.

In this way, the process 408 including steps 502-520 can be performed dynamically, periodically or on demand while a vehicle is moving, as long as the radar unit continues to generate radar scans of the surroundings.

Figure 6:
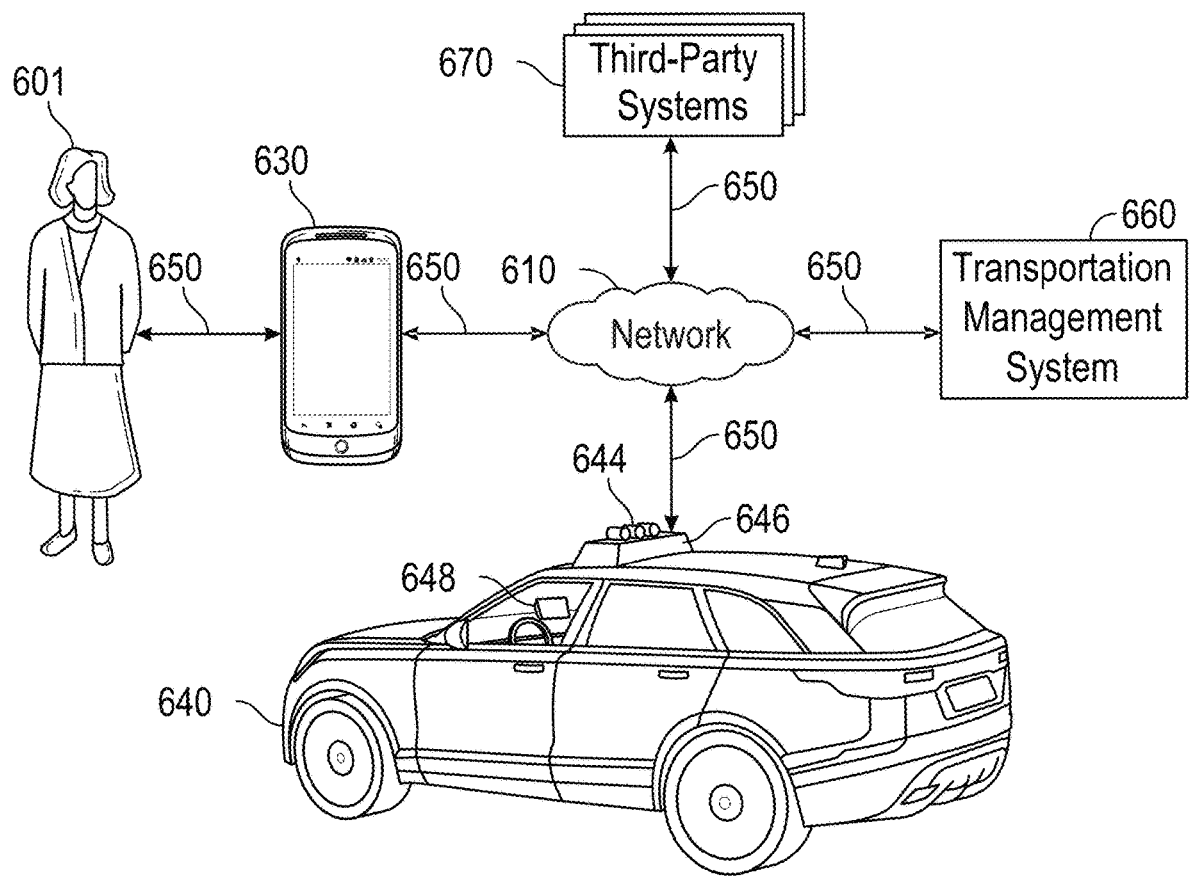
FIG. 6 illustrates an example block diagram of a transportation management environment, according to an embodiment of the present technology.

FIG. 6 illustrates an example block diagram of a transportation management environment for matching ride requestors with vehicles. In particular embodiments, the environment may include various computing entities, such as a user computing device 630 of a user 601 (e.g., a ride provider or requestor), a transportation management system 660, a vehicle 640, and one or more third-party systems 670. The vehicle 640 can be autonomous, semi-autonomous, or manually drivable. The computing entities may be communicatively connected over any suitable network 610. As an example and not by way of limitation, one or more portions of network 610 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 6 illustrates a single user device 630, a single transportation management system 660, a single vehicle 640, a plurality of third-party systems 670, and a single network 610, this disclosure contemplates any suitable number of each of these entities. As an example and not by way of limitation, the network environment may include multiple users 601, user devices 630, transportation management systems 660, vehicles 640, third-party systems 670, and networks 610. In some embodiments, some or all of the blocks or modules shown in FIG. 2 may be implemented by one or more computing systems of the transportation management system 660. In some embodiments, some or all of the blocks or modules shown in FIG. 2 may be implemented by one or more computing systems in the vehicle 640.

The user device 630, transportation management system 660, vehicle 640, and third-party system 670 may be communicatively connected or co-located with each other in whole or in part. These computing entities may communicate via different transmission technologies and network types. For example, the user device 630 and the vehicle 640 may communicate with each other via a cable or short-range wireless communication (e.g., Bluetooth, NFC, WI-FI, etc.), and together they may be connected to the Internet via a cellular network that is accessible to either one of the devices (e.g., the user device 630 may be a smartphone with LTE connection). The transportation management system 660 and third-party system 670, on the other hand, may be connected to the Internet via their respective LAN/WLAN networks and Internet Service Providers (ISP). FIG. 6 illustrates transmission links 650 that connect user device 630, vehicle 640, transportation management system 660, and third-party system 670 to communication network 610. This disclosure contemplates any suitable transmission links 650, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 650 may connect to one or more networks 610, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 650. For example, the user device 630 may communicate with the transportation management system via a cellular network and the Internet, but communicate with the vehicle 640 via Bluetooth or a physical wire connection.

In particular embodiments, the transportation management system 660 may fulfill ride requests for one or more users 601 by dispatching suitable vehicles. The transportation management system 660 may receive any number of ride requests from any number of ride requestors 601. In particular embodiments, a ride request from a ride requestor 601 may include an identifier that identifies the ride requestor in the system 660. The transportation management system 660 may use the identifier to access and store the ride requestor's 601 information, in accordance with the requestor's 601 privacy settings. The ride requestor's 601 information may be stored in one or more data stores (e.g., a relational database system) associated with and accessible to the transportation management system 660. In particular embodiments, ride requestor information may include profile information about a particular ride requestor 601. In particular embodiments, the ride requestor 601 may be associated with one or more categories or types, through which the ride requestor 601 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 660 may classify a user 601 based on known information about the user 601 (e.g., using machine-learning classifiers), and use the classification to retrieve relevant aggregate information associated with that class. For example, the system 660 may classify a user 601 as a young adult and retrieve relevant aggregate information associated with young adults, such as the type of music generally preferred by young adults.

Transportation management system 660 may also store and access ride information. Ride information may include locations related to the ride, traffic data, route options, optimal pick-up or drop-off locations for the ride, or any other suitable information associated with a ride. As an example and not by way of limitation, when the transportation management system 660 receives a request to travel from San Francisco International Airport (SFO) to Palo Alto, Calif., the system 660 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 660. For example, historical data may include aggregate information generated based on past ride information, which may include any ride information described herein and telemetry data collected by sensors in vehicles and user devices. Historical data may be associated with a particular user (e.g., that particular user's preferences, common routes, etc.), a category/class of users (e.g., based on demographics), and all users of the system 660. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 660 in particular embodiments may predict and provide ride suggestions in response to a ride request. In particular embodiments, the system 660 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and semi-supervised learning based on a mixture of labeled and unlabeled training data.

In particular embodiments, transportation management system 660 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 660 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 630 (which may belong to a ride requestor or provider), a transportation management system 660, vehicle system 640, or a third-party system 670 to process, transform, manage, retrieve, modify, add, or delete the information stored in the data store.

In particular embodiments, transportation management system 660 may include an authorization server (or any other suitable component(s)) that allows users 601 to opt-in to or opt-out of having their information and actions logged, recorded, or sensed by transportation management system 660 or shared with other systems (e.g., third-party systems 670). In particular embodiments, a user 601 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 601 of transportation management system 660 through blocking, data hashing, anonymization, or other suitable techniques as appropriate.

In particular embodiments, third-party system 670 may be a network-addressable computing system that may provide HD maps or host GPS maps, customer reviews, music or content, weather information, or any other suitable type of information. Third-party system 670 may generate, store, receive, and send relevant data, such as, for example, map data, customer review data from a customer review website, weather data, or any other suitable type of data. Third-party system 670 may be accessed by the other computing entities of the network environment either directly or via network 610. For example, user device 630 may access the third-party system 670 via network 610, or via transportation management system 660. In the latter case, if credentials are required to access the third-party system 670, the user 601 may provide such information to the transportation management system 660, which may serve as a proxy for accessing content from the third-party system 670.

In particular embodiments, user device 630 may be a mobile computing device such as a smartphone, tablet computer, or laptop computer. User device 630 may include one or more processors (e.g., CPU, GPU), memory, and storage. An operating system and applications may be installed on the user device 630, such as, e.g., a transportation application associated with the transportation management system 660, applications associated with third-party systems 670, and applications associated with the operating system. User device 630 may include functionality for determining its location, direction, or orientation, based on integrated sensors such as GPS, compass, gyroscope, or accelerometer. User device 630 may also include wireless transceivers for wireless communication and may support wireless communication protocols such as Bluetooth, near-field communication (NFC), infrared (IR) communication, WI-FI, and 2G/3G/4G/LTE/5G mobile communication standard. User device 630 may also include one or more cameras, scanners, touchscreens, microphones, speakers, and any other suitable input-output devices.

In particular embodiments, the vehicle 640 may be equipped with an array of sensors 644, a navigation system 646, and a ride-service computing device 648. In particular embodiments, a fleet of vehicles 640 may be managed by the transportation management system 660. The fleet of vehicles 640, in whole or in part, may be owned by the entity associated with the transportation management system 660, or they may be owned by a third-party entity relative to the transportation management system 660. In either case, the transportation management system 660 may control the operations of the vehicles 640, including, e.g., dispatching select vehicles 640 to fulfill ride requests, instructing the vehicles 640 to perform select operations (e.g., head to a service center or charging/fueling station, pull over, stop immediately, self-diagnose, lock/unlock compartments, change music station, change temperature, and any other suitable operations), and instructing the vehicles 640 to enter select operation modes (e.g., operate normally, drive at a reduced speed, drive under the command of human operators, and any other suitable operational modes).

In particular embodiments, the vehicles 640 may receive data from and transmit data to the transportation management system 660 and the third-party system 670. Examples of received data may include, e.g., instructions, new software or software updates, maps, 3D models, trained or untrained machine-learning models, location information (e.g., location of the ride requestor, the vehicle 640 itself, other vehicles 640, and target destinations such as service centers), navigation information, traffic information, weather information, entertainment content (e.g., music, video, and news) ride requestor information, ride information, and any other suitable information. Examples of data transmitted from the vehicle 640 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 640, passengers may send/receive data to the transportation management system 660 and third-party system 670), and any other suitable data.

In particular embodiments, vehicles 640 may also communicate with each other, including those managed and not managed by the transportation management system 660. For example, one vehicle 640 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) or over a network (e.g., the Internet or via the transportation management system 660 or third-party system 670), or both.

In particular embodiments, a vehicle 640 may obtain and process sensor/telemetry data. Such data may be captured by any suitable sensors. For example, the vehicle 640 may have a Light Detection and Ranging (LiDAR) sensor array of multiple LiDAR transceivers that are configured to rotate 360°, emitting pulsed laser light and measuring the reflected light from objects surrounding vehicle 640. In particular embodiments, LiDAR transmitting signals may be steered by use of a gated light valve, which may be a MEMs device that directs a light beam using the principle of light diffraction. Such a device may not use a gimbaled mirror to steer light beams in 360° around the vehicle. Rather, the gated light valve may direct the light beam into one of several optical fibers, which may be arranged such that the light beam may be directed to many discrete positions around the vehicle. Thus, data may be captured in 360° around the vehicle, but no rotating parts may be necessary. A LiDAR is an effective sensor for measuring distances to targets, and as such may be used to generate a three-dimensional (3D) model of the external environment of the vehicle 640. As an example and not by way of limitation, the 3D model may represent the external environment including objects such as other cars, curbs, debris, objects, and pedestrians up to a maximum range of the sensor arrangement (e.g., 50, 100, or 200 meters). As another example, the vehicle 640 may have optical cameras pointing in different directions. The cameras may be used for, e.g., recognizing roads, lane markings, street signs, traffic lights, police, other vehicles, and any other visible objects of interest. To enable the vehicle 640 to "see" at night, infrared cameras may be installed. In particular embodiments, the vehicle may be equipped with stereo vision for, e.g., spotting hazards such as pedestrians or tree branches on the road. As another example, the vehicle 640 may have radars for, e.g., detecting other vehicles and hazards afar. Furthermore, the vehicle 640 may have ultrasound equipment for, e.g., parking and obstacle detection. In addition to sensors enabling the vehicle 640 to detect, measure, and understand the external world around it, the vehicle 640 may further be equipped with sensors for detecting and self-diagnosing the vehicle's own state and condition. For example, the vehicle 640 may have wheel sensors for, e.g., measuring velocity; global positioning system (GPS) for, e.g., determining the vehicle's current geolocation; and inertial measurement units, accelerometers, gyroscopes, and odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, the vehicle 640 may build a 3D model of its surrounding based on data from its LiDAR, radar, sonar, and cameras, along with a pre-generated map obtained from the transportation management system 660 or the third-party system 670. Although sensors 644 appear in a particular location on the vehicle 640 in FIG. 6, sensors 644 may be located in any suitable location in or on the vehicle 640. Example locations for sensors include the front and rear bumpers, the doors, the front windshield, on the side panel, or any other suitable location.

In particular embodiments, the vehicle 640 may be equipped with a processing unit (e.g., one or more CPUs and GPUs), memory, and storage. The vehicle 640 may thus be equipped to perform a variety of computational and processing tasks, including processing the sensor data, extracting useful information, and operating accordingly. For example, based on images captured by its cameras and a machine-vision model, the vehicle 640 may identify particular types of objects captured by the images, such as pedestrians, other vehicles, lanes, curbs, and any other objects of interest.

In particular embodiments, the vehicle 640 may have a navigation system 646 responsible for safely navigating the vehicle 640. In particular embodiments, the navigation system 646 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 646 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 646 may use its determinations to control the vehicle 640 to operate in prescribed manners and to guide the vehicle 640 to its destinations without colliding into other objects. Although the physical embodiment of the navigation system 646 (e.g., the processing unit) appears in a particular location on the vehicle 640 in FIG. 6, navigation system 646 may be located in any suitable location in or on the vehicle 640. Example locations for navigation system 646 include inside the cabin or passenger compartment of the vehicle 640, near the engine/battery, near the front seats, rear seats, or in any other suitable location.

In particular embodiments, the vehicle 640 may be equipped with a ride-service computing device 648, which may be a tablet or any other suitable device installed by transportation management system 660 to allow the user to interact with the vehicle 640, transportation management system 660, other users 601, or third-party systems 670. In particular embodiments, installation of ride-service computing device 648 may be accomplished by placing the ride-service computing device 648 inside the vehicle 640, and configuring it to communicate with the vehicle 640 via a wired or wireless connection (e.g., via Bluetooth). Although FIG. 6 illustrates a single ride-service computing device 648 at a particular location in the vehicle 640, the vehicle 640 may include several ride-service computing devices 648 in several different locations within the vehicle. As an example and not by way of limitation, the vehicle 640 may include four ride-service computing devices 648 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 648 may be detachable from any component of the vehicle 640. This may allow users to handle ride-service computing device 648 in a manner consistent with other tablet computing devices. As an example and not by way of limitation, a user may move ride-service computing device 648 to any location in the cabin or passenger compartment of the vehicle 640, may hold ride-service computing device 648, or handle ride-service computing device 648 in any other suitable manner. Although this disclosure describes providing a particular computing device in a particular manner, this disclosure contemplates providing any suitable computing device in any suitable manner.

Figure 7:
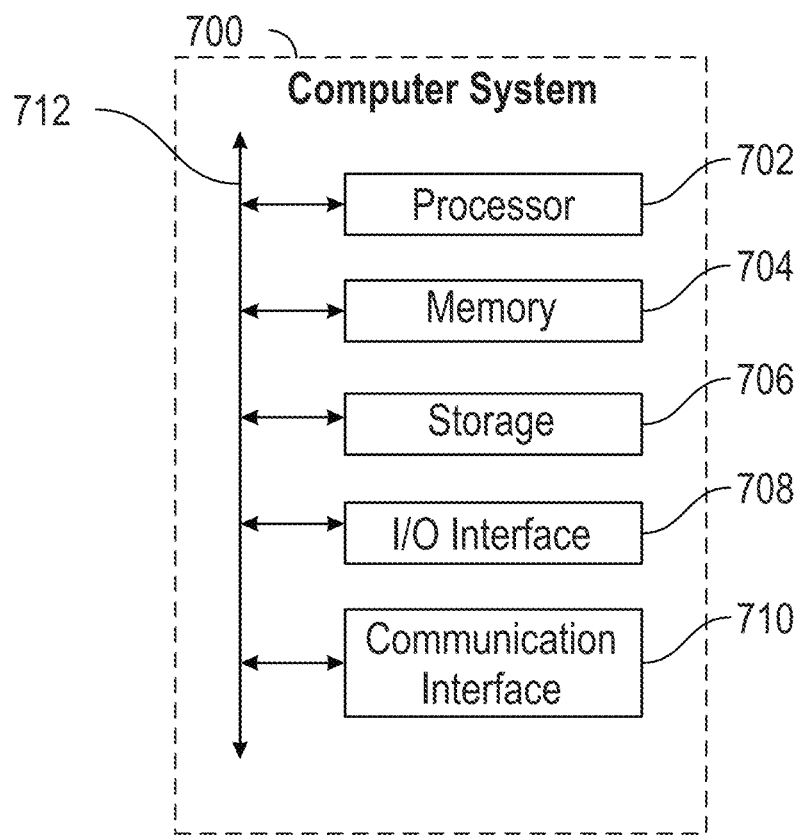
FIG. 7 illustrates an example of a computer system or computing device that can be utilized in various scenarios, according to an embodiment of the present technology.

FIG. 7 illustrates an example computer system 700. In particular embodiments, one or more computer systems 700 perform one or more steps of one or more methods described or illustrated herein. In particular embodiments, one or more computer systems 700 provide the functionalities described or illustrated herein. In particular embodiments, software running on one or more computer systems 700 performs one or more steps of one or more methods described or illustrated herein or provides the functionalities described or illustrated herein. Particular embodiments include one or more portions of one or more computer systems 700. Herein, a reference to a computer system may encompass a computing device, and vice versa, where appropriate. Moreover, a reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 that are to be operated on by computer instructions; the results of previous instructions executed by processor 702 that are accessible to subsequent instructions or for writing to memory 704 or storage 706; or any other suitable data.

The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs), be a multi-core processor, or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described in further detail below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware or software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware or software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware or software, or both coupling components of computer system 700 to each other. As an example and not by way of limitation, bus 712 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A or B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more steps of the methods described herein, where appropriate. Although this disclosure describes and illustrates particular steps of certain methods as occurring in a particular order, this disclosure contemplates any suitable steps of the methods occurring in any suitable order or in any combination which may include all, some, or none of the steps of the methods. Furthermore, although this disclosure may describe and illustrate particular components, devices, or systems carrying out particular steps of a method, this disclosure contemplates any suitable combination of any suitable components, devices, or systems carrying out any suitable steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method of calibrating a sensor unit on a vehicle while the vehicle is in motion, the method comprising:
   transmitting, from a processor to the sensor unit, a control signal that causes a position of the sensor unit relative to an inertial measurement unit (IMU) to be tuned for positions between the IMU and the sensor unit while the vehicle is in motion;
   obtaining sensor data scans captured by the sensor unit while the sensor unit is tuned to the positions;
   identifying target points from the sensor data scans, wherein target points represent one or more static objects in an environment around the vehicle while the vehicle is in motion; and
   determining a calibration position for the sensor unit based on a trajectory pattern of the target points over the sensor data scans.

2. The method of claim 1, wherein the sensor unit is a radar unit, and the positions include an angle that the radar unit is facing relative to the IMU.

3. The method of claim 2, wherein the sensor unit is tuned by sweeping the angle progressively at a pre-defined degree increment.

4. The method of claim 1, wherein the sensor data scans are captured at a pre-defined interval, and at least one or more of the sensor data scans are captured at the positions to which the sensor unit is tuned.

5. The method of claim 1, wherein the identifying the target points from of the sensor data scans represent one or more static objects in the environment located in while the vehicle is in motion comprises:
   identifying a first set of target points from a first sensor data scan from the sensor data scans;
   identifying a second set of target points from a second sensor data scan from the sensor data scans; and
   in response to determining that an aggregated average distance between the first set of target points and the second set of target points within a sensor data scan frame is less than a pre-defined threshold, determining that the first set of target points and the second set of target points relate to a same static object in the environment.

6. The method of claim 1, wherein determining the calibration position for the sensor unit based on the trajectory pattern of the target points over the sensor data scans comprises:
   monitoring the trajectory pattern of the target points representing a same static object in the environment shown in the sensor data scans;
   identifying a position for the sensor unit at which the target points representing the same static object shown in a corresponding sensor data scan captured at the position is associated with a minimum variance; and
   determining the position as the calibration position for the sensor unit.

7. The method of claim 6, wherein the position associated with the minimum variance is determined by:
   obtaining a first sensor data scan captured when the sensor unit is tuned to a first position;
   identifying a first set of target points from the first sensor data scan;

transmitting, to the sensor unit, a first control signal that causes the sensor unit to be progressively tuned in a first direction from the first position to a second position;

obtaining a second sensor data scan captured when the sensor unit is tuned to the second position;

identifying, from the second sensor data scan, a second set of target points representing the same static object with the first set of target points; and in response to determining that the second set of target points is converging as compared with the first set of target points, transmitting, to the sensor unit, a second control signal that causes the sensor unit to be tuned in the first direction from the second position to a third position.

8. The method of claim 7, further comprising:

in response to determining that the second set of target points is diverging as compared with the first set of target points, transmitting, to the sensor unit, a third control signal that causes the sensor unit to be tuned in a second direction that is opposite to the first direction.

9. The method of claim 1, wherein the calibration position for the sensor unit is updated periodically or on demand while the vehicle is in motion.

10. The method of claim 1, wherein the calibration position for the sensor unit is determined or updated adaptively using the sensor data scans captured in real: time without using map data indicating a location of the one or more static objects in the environment.

11. A system for calibrating a sensor unit on a vehicle while the vehicle is in motion, comprising:

one or more non-transitory computer-readable storage media embodying instructions; and one or more processors coupled to the storage media and operable to execute the instructions to:

transmit, from a processor to the sensor unit, a control signal that causes the sensor unit installed with the vehicle to be tuned for a plurality of positions between an inertial measurement unit (IMU) and the sensor unit while the vehicle is in motion;

obtain a plurality of sensor data scans captured by the sensor unit while the sensor unit is tuned to the plurality of positions;

identify one or more target points from each of the plurality of sensor data scans, wherein the one or more target points represent one or more static objects in an environment that the vehicle is situated at while in motion; and determine a calibration position for the sensor unit based on a trajectory pattern of the one or more target points over the plurality of sensor data scans.

12. The system of claim 11, wherein the sensor unit is a radar unit, and each of the plurality of positions includes a boresight angle that the radar unit is facing, and wherein the sensor unit is tuned by sweeping the boresight progressively at a pre-defined degree interval each time.

13. The system of claim 11, wherein the plurality of sensor data scans are captured at a pre-defined interval, and at least one or more of the plurality of sensor data scans are captured at each of the positions to which the sensor unit is tuned.

14. The system of claim 11, wherein identifying the one or more target points comprises:

identifying a first set of target points from a first sensor data scan from the plurality of sensor data scans;

identifying a second set of target points from a second sensor data scan from the plurality of sensor data scans; and in response to determining that an aggregated average distance between the first set of target points and the second set of target points within a sensor data scan frame is less than a pre-defined threshold, determining that the first set of target points and the second set of target points relate to a same static object in the environment.

15. The system of claim 11, wherein determining the calibration position comprises:

monitoring the trajectory pattern of the one or more target points representing a same static object in the environment shown in the plurality of sensor data scans;

identifying a position for the sensor unit at which the one or more target points representing the same static object shown in a corresponding sensor data scan captured at the position contain exhibit a minimum variance; and determining the position as the calibration position for the sensor unit.

16. The system of claim 15, wherein the position associated with the minimum variance is determined by:

obtaining a first sensor data scan captured when the sensor unit is tuned to a first position;

identifying a first set of target points from the first sensor data scan;

transmitting, to the sensor unit, a first control signal that causes the sensor unit to be progressively tuned in a first direction from the first position to a second position;

obtaining a second sensor data scan captured when the sensor unit is tuned to the second position;

identifying, from the second sensor data scan, a second set of target points representing the same static object with the first set of target points; and in response to determining that the second set of target points is converging as compared with the first set of target points, transmitting, to the sensor unit, a second control signal that causes the sensor unit to be tuned in the first direction from the second position to a third position.

17. The system of claim 16, wherein the one or more processors are further operable to execute the instructions to:

in response to determining that the second set of target points is diverging as compared with the first set of target points, transmit, to the sensor unit, a third control signal that causes the sensor unit to be tuned in a second direction that is different from the first direction.

18. The system of claim 11, wherein the calibration position for the sensor unit is updated periodically or on demand while the vehicle is in motion.

19. The system of claim 11, wherein the calibration position for the sensor unit is determined or updated adaptively using the plurality of sensor data scans captured in real time without using any map data indicating a location of the one or more static objects in the environment.

20. One or more non-transitory computer-readable storage media embodying software for calibrating a sensor unit on a vehicle while the vehicle is in motion and that is operable when executed by a computing system to:

transmit, from a processor to the sensor unit, a control signal that causes the sensor unit installed with the vehicle to be tuned for a plurality of positions while the vehicle is in motion;

obtain a plurality of sensor data scans captured by the sensor unit while the sensor unit is tuned to the plurality of positions;
identify one or more target points from each of the plurality of sensor data scans, wherein the one or more target points represent one or more static objects at a location that the vehicle is at while in motion; and
determine a calibration position for the sensor unit based on a trajectory pattern of the one or more target points over the plurality of sensor data scans.

* * * * *